United States Patent [19]

King, Sr.

[11] Patent Number: 4,687,798

[45] Date of Patent: Aug. 18, 1987

[54] SOLVENT CEMENT

[76] Inventor: Lloyd H. King, Sr., 5222 Green Farms Rd., Edina, Minn. 55436

[21] Appl. No.: 822,861

[22] Filed: Jan. 27, 1986

[51] Int. Cl.$^4$ .............................................. C08K 5/34
[52] U.S. Cl. ................................... 524/100; 524/104; 156/83; 156/308.6; 156/309.3; 156/326; 106/287.2; 106/311; 252/171; 252/364
[58] Field of Search .................. 524/100, 104; 156/83, 156/308.6, 309.3, 326; 106/287.2, 311; 252/364, 171

[56] References Cited

U.S. PATENT DOCUMENTS

| | | | |
|---|---|---|---|
| 2,616,868 | 11/1952 | Heisenberg et al. | 524/100 |
| 3,576,751 | 4/1971 | Noznick et al. | 252/162 |
| 3,764,384 | 10/1973 | Bernie | 524/104 |
| 4,055,515 | 10/1977 | Kirch | 252/542 |
| 4,098,719 | 7/1978 | Hushebeck. | |

FOREIGN PATENT DOCUMENTS

| | | |
|---|---|---|
| 1036489 | 7/1966 | United Kingdom . |
| 711059 | 1/1980 | U.S.S.R. . |

*Primary Examiner*—Joseph L. Schofer
*Assistant Examiner*—N. Sarofim
*Attorney, Agent, or Firm*—Jacobson and Johnson

[57] ABSTRACT

The present invention describes novel solvent cements which are a combination of a solvent which is a 5- or 6-membered ring lactam and a cosolvent which is one or more lower alkanols and/or one or more lower alkyl esters of lower alkanoic acids and, optionally, include a water-insoluble polymer such as PVC or ABS.

6 Claims, No Drawings

SOLVENT CEMENT

BACKGROUND OF THE INVENTION

The glue and cement art is a mature technology. Many and varied glues and cements have been described and much speculative disclosure has been made about such compositions. In spite of, or perhaps because of the abundance of information available about glues and cements, needs for improved compositions continue to exist. It has become extremely difficult to find the necessary information about suitable cements for specific purposes.

The need for safer cements has become more apparent as industry and the consumer have become more aware of the potential toxic liabilities of various glue and cement solvents, but these cements must effectively bond. In view of this need for increased safety, certain cements have utilized cyclic 5- or 6-membered ring lactam solvents such as N-methyl-2-pyrrolidone.

U.S. Pat. No. 3,404,117 of Uffner describes an adhesive film-forming composition that, when in the dry state, is insoluble in either water or dry cleaning solvents. The adhesive comprises a blend of one of a certain class of fluorinated copolymers and a plasticizer in a solvent. Some of the solvents claimed are N-methyl-2-pyrrolidone and aliphatic alcohols.

G.B. Pat. No. 1,572,481 describes an "... adhesive containing polyvinyl alcohol or ethylene/vinyl alcohol copolymer, a crystalline solvent for the polymer and a viscosity-reducing diluent." The viscosity-reducing diluents include polyhydric alcohols.

U.S. Pat. No. 2,616,868 of Heisenberg and Kleine describes liquid compositions for solutions of polymers and copolymers of vinyl chloride which are used to spin threads. In their description of the prior art, Heisenberg and Kleine point out that there are a series of lactones and lactams which, according to the literature, are "... suitable as solvents for polymers and copolymers of vinyl compounds."

Fogle, et al, U.S. Pat. No. 4,152,313, describe an adhesive composition of "... vinyl acetate-ethylene emulsion and an admixture of toluene and N-lower alkyl substituted pyrrolidone."

Still other adhesives for use in joining plastics, such as plastic pipes or the like, are known and generally comprised of polymers such as poly(acrylonitrile-butadiene-styrene) (ABS) or poly(vinylchloride) (PVC) in a solvent or a blend of solvents such as methyl ethyl ketone, toluene and/or tetrahydrofuran.

Still other adhesives for use in pipes or the like are known which comprise a suitable polymer such as ABS or PVC and a solvent mixture consisting only of lactones or lactams, and in particular, preferred lactams such as N-methyl-2-pyrrolidone (NMP). These formulations perform well in warm weather and at elevated temperatures, but their properties as bonding agents are less acceptable under low temperature conditions.

Generally, the requirements for solvent cements for use in the plastic industry require that certain strength criteria are met and that the solvents be suitable for use without causing undue user health problems. The standards for solvent cements for use in the United States are specified in Bulletin ASTM D2564-80, published by the American Society for Testing Materials, 1916 Race Street, Phila. Pa. The ASTM Specification for "Solvent Cements for Polyvinyl Chloride Plastic Pipe and Fittings" specifies that the solvent cement should have certain minimum resin content and meet certain minimum requirements for viscosity and strength. For example, the specified minimum resin content for cement for PVC pipe is 10% by weight of the solution and the lap shear strength when tested in accordance with the test procedures requires that the joint between two surfaces have a strength of at least 250 psi after a 2 hour curing time, at least 500 psi after a 16 hour curing time, and at least 900 psi after a 72 hour curing time.

Since, generally, these solvent cements are made from flammable liquids, the specification requires that the solvent should be kept away from sources of ignition and, in addition, ventilation should be maintained not only to minimize fire risk, but to minimize breathing of solvent vapors. In addition, one should avoid direct contact of the solvent cement with the user.

One of the preferred adhesive solvents is N-methyl-2-pyrrolidone. While it is flammable, it has a relatively high flashpoint of 204° F. and, according to the manufacturer, it has a low order of oral toxicity and only produces mild topical effects. Because of these characteristics, N-methyl-2-pyrrolidone is one of the better or safer solvents to use in the solvent cements. However, when N-methyl-2-pyrrolidone alone is used in combination with resins such as ABS or PVC a specified by the ASTM Testing Standards, the solvent adhesive may not pass the lap shear strength requirements.

SUMMARY OF THE INVENTION

The present invention provides novel solvent cements which provide and combine acceptable characteristics in their properties of flammability, safety to the user, environmental acceptability, and bonding strength.

The invention relates to cements comprising a combination of a solvent which is a 5- or 6-membered ring lactam and a cosolvent which is one or more lower alkanols and/or one or more lower alkyl esters of lower alkanoic acids and, optionally, include a water-insoluble polymer such as poly(vinylchloride) or poly(acrylonitrile-butadiene-styrene).

The invention also relates to a method for forming a cemented juncture between surfaces of articles comprising primarily water-insoluble polymers such as PVC and/or ABS which comprises applying a cement of the invention to at least one of the surfaces to be joined, mating the surfaces to be joined, and allowing the juncture to form.

This invention also relates to the use of thixotropic, e.g., viscosity-adjusting agents, in combination with the solvent adhesives of the invention.

DESCRIPTION OF THE PREFERRED EMBODIMENT

In my solvent cement, I have found that although certain solvents when used alone have insufficient adhesive properties to produce a solvent adhesive of sufficient strength to meet the ASTM lapshear test requirements, when combined and added to a polymer resin, these combinations produce a solvent adhesive which exceeds ASTM lapshear strength requirements. More particularly, I have found that the combinations of cyclic 5- or 6-membered ring lactams such as N-methyl-2-pyrrolidone and either lower alkanols such as methyl alcohol or lower alkyl esters of lower alkanoic acids such as ethyl acetate, alone or together with resins such as ABS or PVC, produce a solvent cement which meets or exceeds the lapshear strength requirements specified in the ASTM Test Standards. This is particularly surprising in view of the fact that methyl alcohol or ethyl acetate alone or together with ABC or PVC do not provide good solvent cements.

Suitable 5- or 6-membered ring lactams for use in the cements of the present invention include N-phenyl-2-pyrrolidone, 2-piperidone, 2-pyrrolidone, N-ethyl-2-pyrrolidone, N-methyl-2-pyrrolidone, and equivalents thereof. N-Alkylated lactams, particularly N-methylated lactams, are preferred. Presently preferred is N-methyl-2-pyrrolidone because of its ready availability and relatively low cost.

Suitable lower alkanols for use in the cements of the invention are preferably alkanols of four carbon atoms or less such as methanol, ethanol, isopropanol and n-butanol. Methanol is presently preferred because of its ready availability and low cost.

Suitable lower alkyl esters of lower alkanoic acids are preferably esters of lower alkanols as defined above and lower alkanoic acids of one to four carbon atoms such as methyl acetate, ethyl acetate, ethyl formate, ethyl propionate and the like. Ethyl acetate is presently preferred.

The polymer or polymer mixture dissolved in the solvent mixture to form the cement of the invention may be any water-insoluble synthetic organic polymer which is soluble in the solvents to provide an effective cement. Suitable polymers include PVC, ABS, polycarbonate, polystyrene, polyacrylates, cellulose acetate, polyacrylamide, polyamide. and the like. Of these, PVC and ABS are of most interest due to their widespread use. The polymer or polymer mixture dissolved in the solvent mixture to form the cement of the invention may be polymer waste or freshly prepared polymer. Generally, the polymer or polymers in a cement are identical, or at least chemically similar, to the polymer(s) to be cemented.

In general, I have found that if methyl alcohol is used, the alcohol maximum percentage should not exceed 20% by weight or jelling occurs, and minimum percentage rate of alcohol should be approximately 3% by weight or more to provide a workable range for the adhesive when the resin content is about 12%. As the percentage of alcohol decreases in the mixture, it is still usable; however, the lowering of the alcohol content has a diminishing effect on the effectiveness of bonding by the solvent adhesive. It is presently preferred to use methanol-based cements of about 78% NMP, 10% methanol, and 12% resin.

When ethyl acetate is used in the solvent adhesive, the workable range of ethyl acetate ranges from a maximum of 51% by weight of ethyl acetate to a minimum of approximately 3% of ethyl acetate when the resin content of the cement is about 13%. As a general rule, the lesser the amount of ethyl acetate, the lesser the effectiveness of the strength of bonding by the solvent adhesive.

When the cements of the invention are a combination of NMP, ethyl acetate and a resin such as PVC or ABS, it has been found that gellation of the cements, particularly upon aging, can occur when the percent of resin is 10 to 15% and the amount of ethyl acetate significantly exceeds 50%, for example, when it is 60% or more. When the resins are omitted from the formulations, amounts of ethyl acetate can easily be 75%, and amounts as high as 90% have been successfully used.

In general, the solvents such as methyl alcohol and ethyl acetate have been found to decrease cure time of the cement so that one can obtain higher structural strengths at lower cure times.

In a further preferred embodiment of the invention small amounts of a thixotropic agent, e.g., colloidal silica, which provides viscosity control, and optionally, a small amount of an inert metal salt are added to the cement of the invention.

Suitable thixotropic agents are added in relatively small amounts, for example, from about one to five percent by weight of the total formulation. Preferably, they are added in amounts of two to three percent. These agents have been found to be useful for viscosity control in the cements of the invention, although they also increase the complexity and the cost of the cements and are, therefore, most useful in specialized situations where the incremental cost differential is justified by the improved properties.

It has been found that the cements of the present invention improve in quality, i.e., they provide improved bonding, as they age. By aging, I mean standing on the shelf before use.

In general, small amounts, i.e., generally less than five percent, of inert diluents such as metal salts can be added to the cements of the invention without deleterious effect. For example, from one to two percent of sodium chloride was added to several formulations of the invention and these cements had excellent bonding properties.

The following are typical examples of mixtures of the present invention.

EXAMPLE 1

Approximately 78.3% by weight of N-methyl-2-pyrrolidone was added to 5.7% methyl alcohol with the balance being ABS resins. After mixture, the solvent cement was applied to test samples and cured in accordance with the ASTM Standards and subjected to shear tests at 2 hour, 16 hour, and 72 hour intervals. Two samples of each were tested and all of the samples exceeded the test requirements.

EXAMPLE 2

Example 1 was repeated except PVC resins were used and, again, all the test results for the 2, 16, and 72 hour cure exceeded the ASTM Standards.

EXAMPLE 3

A batch of solvent adhesive was formed by mixing approximately 36% by weight of N-methyl-2-pyrrolidone with approximately 51% by weight ethyl acetate and approximately 13% by weight ABS resin. The solvent cement was applied to test samples and allowed to cure and was tested at 2, 16, and 72 hour intervals. Each of the samples exceeded the ASTM Standards.

EXAMPLE 4

The solvent adhesive of Example 3 was prepared except that PVC resins were used in place of the ABS resins. The samples were, again, found to exceed the ASTM test requirements.

The following Table I is illustrative of the test results obtained with different amounts of NMP and methyl alcohol (Me) on bonding of PVC to PVC. In order to meet ASTM lap shear requirements, the average (two samples) bond strength at 2 hours should exceed 250 psi, at 16 hours should exceed 500 psi, and at 72 hours should exceed 900 psi.

TABLE I

| Ex. No. | Composition Solvents | Resin/Adjuvant | Avg. Lap Shear Strength [PVC to PVC (psi)] | Test Hours |
|---|---|---|---|---|
| 5 | 78.3% NMP 5.75% Me | 12% PVC/2.9% Aerosil*, 1.2% NaCl | 366 876 1150 | 2 16 72 |
| 6 | 78.3% NMP 5.75% Me | 12% PVC/2.9% Aerosil, 1.2% NaCl | 341 744 966 | 2 16 72 |
| 7 | 74% NMP 10.9% Me | 11.2% PVC/2.7% Aerosil, 1.1% NaCl | 483 792 1016 | 2 16 72 |
| 8 | 76.1% NMP 8.4% Me | 11.5% PVC/2.8% Aerosil, 1.1% NaCl | 416 804 1000 | 2 16 72 |
| 9 | 71.8% NMP 13.6% Me | 10.9% PVC/2.6% Aerosil, 1.1% NaCl | 525 684 1075 | 2 16 72 |
| 10 | 71% NMP 15% Me | 11% PVC/2% Aerosil 1% NaCl | 408 852 | 2 16 |
| 11 | 74.6% NMP 14.1% Me | 11.3% PVC | 322 | 2 |
| 12 | 81.6% NMP 6% Me | 12.4% PVC | 314 | 2 |

*Aerosil is colloidal silica available from Degussa

Table II illustrates the test results for average (two samples) lap shear strength (given in psi) obtained with varying amounts of ethyl acetate (EA) and added resins in combination with NMP on bonding of ABS to ABS, ABS to PVC, and PVC to PVC.

TABLE II

| Ex. No. | Composition Solvents | Resins | Adjuvant | ABS to ABS | ABS to PVC | PVC to PVC | Hours |
|---|---|---|---|---|---|---|---|
| 13 | 65.5% NMP 21.8% EA | 2.1% ABS 8.4% PVC | 2.2% Aerosil | — — | 508 789 | 558 851 | 2 16 |
| 14 | 71.4% NMP 17.8% EA | 2.1% ABS 8.6% PVC | none | — | 458 | 516 | 2 |
| 15 | 36% NMP 51% EA | 2.1% ABS 8.3% PVC | 2.6% Aerosil | 850 — | 462 1030 1150 | 558 1100 1436 | 2 16 72 |
| 16 | 65.5% NMP 21.8% EA | 2.1% ABS 8.4% PVC | 2.1% Aerosil | — — | 450 1119 | 500 1256 | 2 72 |
| 17 | 36% NMP 51% EA | 2.1% ABS 8.35% PVC | 2.6% Aerosil | — — | 458 870 | 465 1024 | 2 72 |
| 18 | 36% NMP 49% EA | 4.9% ABS 9.8% PVC | none | 250 | 250 | 275 | 2 |
| 19 | 40% NMP 48% EA | 3% ABS 9% PVC | none | 362 | 312 | 425 | 2 |
| 20 | 43.4% NMP 43.4% EA | 2.2% ABS 11% PVC | none | 312 | 325 | 350 | 2 |
| 21 | 40% NMP 48% EA | 12% PVC | none | 325 | 275 | 412 | 2 |

EXAMPLE 22

In order to evaluate the necessity for dissolved resin in the cements the invention, a cement comprising 25% NMP and 75% EA was used to bond ABS to PVC and PVC to PVC, and the average (two samples) ASTM lap shear strength for each formulation was measured at two hours. The results showed 300 psi for ABS to PVC and 462 psi for PVC to PVC. Both results are well above the ASTM Standards.

EXAMPLE 23

A cement comprising 10% NMP and 90% EA was used to bund ABS to ABS, ABS to PVC, and PVC to PVC, and the average (two samples) ASTM lap shear strength for each formulation was measured at two hours. The results showed 232 psi for ABS to ABS, 265 psi for ABS to PVC, and 288 psi for PVC to PVC. The ASTM Standard is not met for bonding of ABS to ABS, indicating that the use of this formulation would be limited to bonding of ABS to PVC and PVC to PVC.

What is claimed is:

1. A solvent cement for joining water insoluble polymers wherein the solvent cement exceeds the standard specified in ASTM Bulletin D-2564-80, comprising about 10 to 15% of a water soluble polymer, a solvent comprised of ethyl acetate and N-methyl-2-pyrrolidone with ethyl acetate ranging from about 3% by weight to about 50% by weight, with the balance N-methyl-2-pyrrolidone.

2. A solvent cement according to claim 1 wherein the polymer is poly(vinylchloride).

3. A solvent cement according to claim 1 wherein the polymer is ABS.

4. A solvent cement according to claim 1 wherein the polymer is a mixture of poly(vinylchloride) and ABS.

5. A solvent cement according to claim 1 wherein a thixotropic agent is included in an amount of one to five percent.

6. A solvent cement according to claim 1 wherein the thixotripic agent is colloidal silica.

* * * * *